United States Patent [19]

Kneafsey

[11] Patent Number: 5,506,326
[45] Date of Patent: Apr. 9, 1996

[54] AIR-ACTIVATABLE POLYMERISABLE COMPOSITIONS CONTAINING ONIUM SALTS

[75] Inventor: Brendan Kneafsey, Dublin, Ireland

[73] Assignee: Loctite (Ireland) Limited, Dublin, Ireland

[21] Appl. No.: 191,235

[22] Filed: Feb. 3, 1994

Related U.S. Application Data

[63] Continuation-in-part of Ser. No. 173,267, Dec. 23, 1993, which is a continuation of Ser. No. 847,157, Mar. 5, 1992, abandoned.

[30] Foreign Application Priority Data

| Mar. 6, 1991 | [IE] | Ireland | 0741/91 |
| Mar. 6, 1991 | [IE] | Ireland | 0742/91 |
| Feb. 13, 1992 | [IE] | Ireland | 0471/92 |
| Feb. 18, 1993 | [IE] | Ireland | S930115 |

[51] Int. Cl.$^6$ .................. C08F 220/28; C08L 75/16
[52] U.S. Cl. .................. 526/320; 525/126; 526/204; 526/279; 526/281; 526/301
[58] Field of Search ............... 525/126; 526/320, 526/346, 347, 328, 328.5, 329; 523/176

[56] References Cited

U.S. PATENT DOCUMENTS

| 1,780,334 | 11/1930 | Burnett et al. . | |
| 2,478,066 | 8/1949 | van Peski . | |
| 2,578,910 | 12/1951 | Uranek . | |
| 2,601,293 | 6/1952 | Howard . | |
| 3,591,438 | 7/1971 | Toback et al. | 156/310 |
| 3,616,040 | 10/1971 | Toback | 156/310 |
| 3,987,019 | 10/1976 | Gruber et al. | 526/328 |
| 3,988,507 | 10/1976 | Gruber et al. | 526/328 |
| 3,991,261 | 11/1976 | Gruber et al. | 526/328 |
| 4,287,255 | 9/1981 | Wong | 428/343 |
| 4,348,503 | 9/1982 | Bachmann | 525/455 |
| 4,395,301 | 7/1983 | Bauer | 156/307.5 |
| 4,395,361 | 7/1983 | Eickhoff et al. | 252/431 |
| 4,429,088 | 1/1984 | Bachmann | 526/135 |
| 4,430,480 | 2/1984 | Melody et al. | 525/160 |
| 4,450,030 | 5/1984 | Melody | 156/307.3 |
| 4,452,955 | 6/1984 | Boeder | 525/518 |
| 4,533,446 | 8/1985 | Conway | 204/159.24 |
| 4,602,073 | 7/1986 | Skoultchi | 526/208 |
| 4,656,229 | 4/1987 | Chiao | 525/518 |
| 4,855,373 | 8/1989 | Wolf et al. | 526/218.1 |
| 4,886,612 | 12/1989 | Novak et al. . | |
| 4,950,701 | 8/1990 | Okamura | 524/237 |
| 5,045,614 | 9/1991 | Buchholz et al. | 526/219.5 |

FOREIGN PATENT DOCUMENTS

| 0169702 | 1/1986 | European Pat. Off. . |
| 0224730 | 6/1987 | European Pat. Off. . |
| 0356875 | 3/1990 | European Pat. Off. . |
| 0502733 | 9/1992 | European Pat. Off. . |
| 287796 | 3/1991 | German Dem. Rep. . |
| 4000776 | 7/1991 | Germany . |
| 040912 | 11/1976 | Japan . |
| 2087906 | 6/1982 | United Kingdom . |

*Primary Examiner*—Christopher Henderson
*Attorney, Agent, or Firm*—Vidas, Arrett, & Steinkraus

[57] ABSTRACT

A one-component air-activatable polymerisable adhesive composition comprising:

(a) a free-radically polymerisable monomer, and an activator system for effective polymerisation of the free-radically polymerisable monomer, said activator system comprising:

(b) an autoxidisable compound which is a dihydropyridine (other than a stabilised 1,4-dihydropyridine)

(c) an onium salt selected from diazonium, iodonium and sulfonium salts which do not interfere with polymerisation, and (d) a soluble ionic salt, with the proviso that the composition does not contain a peroxide, or a peroxide precursor which produces peroxide in the absence of air or any ingredient which is a significant source of radicals in the absence of air.

Exemplary onium salts are diaryl iodonium, triarylsulfonium and aryl diazonium salts.

20 Claims, No Drawings

AIR-ACTIVATABLE POLYMERISABLE COMPOSITIONS CONTAINING ONIUM SALTS

CROSS REFERENCES TO RELATED APPLICATIONS

This application is a continuation-in-part of application Ser. No. 08/173,267 filed Dec. 23 1993, which is a File Wrapper Continuation of Application Serial No. 07/847,157, filed Mar. 5 1992, now abandoned.

BACKGROUND OF THE INVENTION a) Field of the Invention

The invention relates to air-activatable polymerisable compositions and their use. The compositions are suitable for use as one-component systems for forming polymers, requiring no primers. The compositions are useful as adhesives, sealants, surface coatings, moulding resins and composite matrices, for example. These compositions are particularly suitable for use as thread-locking compounds, e.g. for cementing nuts to threaded shafts, bushes to bush housings and the like.

b) Description of the Related Art

The cure of acrylic adhesives is initiated by a two-part redox system. The first part, the initiator, is normally present in the base component of the adhesive and the second part is present in the accelerator or curative component. One widely used curative is the reaction product of aniline and n-butyraldehyde. The reaction product was first known from US Patent No. 1780334 assigned to E. I. Du Pont DeNemours and Co. The condensation of aniline and n-butyraldehyde results in many products, some having complex structures. However it appears that the major component and active ingredient is a substituted dihydropyridine (DHP).

An adhesive composition which can be formulated either as a two-part system or as a system utilising a primer is disclosed in U.S. Pat. No. 3,890,407, assigned to E. I. Du Pont DeNemours and Co. The composition comprises a sulphur-bearing component selected from chlorosulphonated polyethylene and a mixture of sulphonyl chloride with chlorinated polyethylene in at least one polymerisable vinyl monomer and an accelerator comprising a primary amine-aldehyde condensation product. U.S. Pat. No. 4,112,013 also of E. I. Du Pont DeNemours and Co. which was divided from U.S. Pat. No. 3,890,407 specifies that the chlorosulphonated polyethylene is made from branched polyethylene having a melt index of about 100, the chlorosulphonated polyethylene containing about 43% chlorine by weight and about 34 mmoles of sulphonyl chloride per 100 grams of polymer and the composition may also comprise a mixture of methyl-methacrylate, glacial methacrylic acid and ethyleneglycol dimethacrylate. A further U.S. Pat. No. 4,106,971, also divided from U.S. Pat. No. 3,890,407, relates to a method of bonding two surfaces comprising the above disclosed adhesive compositions.

A bonding accelerator containing a condensation reaction product of an aldehyde and a primary or secondary amine is known from U.S. Pat. No. 3,591,438, assigned to Loctite Corporation, together with a reducing activator comprising either a sulphur-containing free radical accelerator or a compound containing an oxidizable transition metal. Such a condensation reaction product is also known for use in conjunction with a polymerisable acrylate ester monomer and a peroxy polymerisation initiator (U.S. Pat. No. 3,616,040 also of Loctite Corporation). U.S. Pat. No. 4,430,480, assigned to Loctite Corporation relates to an adhesive composition which comprises a first part comprising a solution of chlorosulphonated polyethylene in at least one polymerisable vinyl monomer, a polymerisation catalyst which comprises at least one free-radical initiator and a second part comprising an activator composition which consists of at least 70% of the condensation reaction product formed between butyraldehyde and aniline.

An improved adhesive composition of this type, enriched in N-phenyl-3,5-diethyl-2-propyl-1,2-dihydropyridine to a concentration of at least about 70% by weight of the condensation reaction products is known from U.S. Pat. No. 4,430,480.

U.S. Pat. No. 4,602,073 assigned to National Starch & Chemical Corporation describes a two-part adhesive, the first part comprising a mixture of polymerisable optionally substituted acrylic monomers, a diazonium salt initiator and optionally a Lewis acid or salt as stabiliser and a second part comprising an aldehyde-amine condensation product as an activator to induce decomposition of the diazonium salt initiator in the first part.

U.S. Pat. No. 4,656,229 also assigned to National Starch & Chemical Corporation describes a similar two-part anaerobic curing adhesive composition utilising a first part comprising a mixture of free radical polymerisable optionally substituted acrylic monomers and a diaryliodonium salt initiator and a second part comprising an aldehyde-amine condensation product as an activator.

Many of the above compositions based on aldehyde-amine condensation reaction products are, however, two-part systems and suffer from the disadvantages and limitations of use associated with such systems.

An adhesive composition which is described as being polymerisable either aerobically or anaerobically is disclosed in U.S. Pat. Nos. 4,348,503, and 4,429,088 divided therefrom, of Bachmann, and comprises an acrylic ester monomer capable of free-radical polymerisation and a monomeric polyacrylate ester prepolymer together with a catalyst system which comprises an aromatic perester free-radical precursor, an organic acid and a soluble compound of a transition metal cure accelerator. However this composition requires a separate activator such as an amine-aldehyde condensate.

U.S. Pat. No. 4,452,955, assigned to Minnesota Mining and Manufacturing Company, discloses an adhesive composition comprising a polymerisable monomer having at least one alpha, beta-unsaturated carboxyl functionality and as an accelerator an organic sulphimide or perfluroalkylsulphonanilide, together with an inhibitor of free-radical polymerisation to retard polymerisation of the unsaturated carboxyl functionality on contact with the accelerator, and a condensation reaction product of an aldehyde and a primary or secondary amine.

Free radical polymerizable compositions are disclosed in European Patent Specification No. 0,356,875 of Henkel KGA. These comprise ethylenically unsaturated, polymerizable compounds together with an activator system which can be initiated by oxygen and water, comprising an N-alkyl-substituted tert-arylamine with at least one aliphatic CH bond in the alpha position, a metal compound generally used for accelerating the drying of unsaturated oil and which is at least partially soluble in the composition, and a compound of a weakly acidic carboxylic acid having a pKa value of no less than about 0.9, which can be hydrolyzed to a free carboxylic acid on contact with moisture.

The N-alkyl-substituted tert.-arylamines correspond in particular to the general formula:

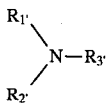

in which $R_{1'}$ is an optionally substituted aryl radical, more especially an optionally alkyl-substituted phenyl radical, $R_{2'}$ has the same meaning as $R_{1'}$ or is an optionally substituted, linear or branched alkyl radical and $R_{3'}$ is a linear or branched alkyl radical which may be substituted, but contains at least one hydrogen atom in the alpha-position to the nitrogen. These compositions depend on the action of both water and oxygen to effect a cure reaction. As such their formulations are very dependant on humidity conditions.

WO91/10687-A of Henkel KGaA discloses air-activatable adhesive compositions comprising mixtures of free-radically polymerisable unsaturated olefinic compounds, and hydrazone compounds prepared and stored under anaerobic conditions. The hydrazones may be alkyl, cycloalkyl and/or aryl hydrazone(s) of aldehyde(s) and/or ketone(s) and are claimed to react with air to form hydroperoxides useful as polymerisation initiators. The one component compositions are stable in the absence of air.

EP 0,502,733A of Loctite (Ireland) Limited (the contents of which are incorporated herein by reference) describes a one-part air-activatable polymerisable composition comprising:

(a) at least one free-radically polymerisable monomer, and
(b) an activator system for effective polymerisation of the free-radically polymerisable monomer, said activator system comprising at least one auto-oxidisable compound of a formula which includes the structure I:

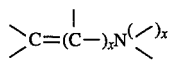   I where x is 0 or 1, and where the lines representing unfilled valencies indicate bonds to carbon, hydrogen or hetero atoms, alone or in combination with a weak acid;

with the proviso that:

when x=0, the nitrogen atom in structure I is not bonded to a second nitrogen atom:

and when x=1 there is a structure I in the compound in which the

moiety does not form part of a phenyl ring;
with the proviso that the composition does not contain a peroxide, or a peroxide precursor which produces peroxide in the absence of air or any ingredient which is a significant source of radicals in the absence of air.

Preferred auto-oxidisable compounds are selected from the group consisting of partially hydrogenated pyridines, condensation products of cyclic ketones and ureas, Schiff's bases, indoles, pyrroles, imidazoles, piperazines, carbazoles, tetrahydroquinolines, and substituted derivatives thereof, particularly dihydropyridines.

The presence of a weak acid is generally preferred in order to achieve a satisfactory rate of auto-oxidation for the partially hydrogenated pyridines. The majority of the working examples using dihydropyridines in EP 92 301 899.8 have acrylic acid in the formulation. Other acids used are methacrylic acid, trichloroacetic acid, cyanoacetic acid, salicylic acid, benzoic acid, acetic acid and saccharin.

The composition may also contain a soluble ionic salt, particularly a cobalt or iron salt.

The compositions as described in EP 92 301 899.8 are stable on storage in the absence of air, are activated by exposure to air, and will then cure in either the presence or absence of air. However the use of volatile acids, particularly acrylic acid, may give rise to odour problems in a working environment.

DD 287 796 A6 describes a spectrally sensitised photo polymerisable material useful in systems for data recording and for producing printing plates, printed circuits, photo-curable adhesives and surface coatings. The material has high sensitivity to near UV and short wavelength visible light in the 310–420 nm range. The material has an initiator system comprising certain light-absorbing 1,4-dihydropyridines having electron-withdrawing substituents (ester, acid, ketone, amide or nitrile groups) at the 3- and 5-positions, and one of a range of onium salts which include iodonium and sulfonium salts. It is known that electron-withdrawing substituents capable of resonance interaction in the 3- and 5-positions stabilize 1,4-dihydropyridines by extending the conjugation ("THE CHEMISTRY OF DIHYDROPYRIDINES" by Ulli Eisner and Josef Kuthan in Chemical Reviews, Vol. 72, No. 1, 1972, pages 1–42 at page 3). Such stabilised 1,4-dihydropyridines would not be reactive with oxygen and it is noteworthy that the specification makes no reference to any involvement of air in the initiation of polymerisation. Therefore DD 287,796 A6 contains no teaching about air-activatable compositions but depends upon the stability and light-absorbing characteristics of the particular 1,4-dihydropyridines disclosed therein.

It is the object of the present invention to provide a one component substrate-insensitive polymerisable composition which is stable on storage in the absence of air, which is activated by exposure to air (without requiring photo-activation) and which then cures in either the presence or absence of air, but which does not require the presence of a weak acid for satisfactory auto-oxidation performance.

It is an object of this invention to provide an air-activatable composition which does not require photo initiation.

SUMMARY OF THE INVENTION

According to the present invention there is provided an air-activatable polymerisable composition comprising:

(a) a free-radically polymerisable monomer, and an activator system for effective polymerisation of the free-radically polymerisable monomer, said activator system comprising:

(b) an auto-oxidisable compound which is a dihydropyridine having a general formula selected from II:

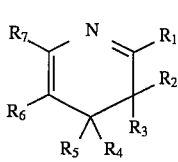 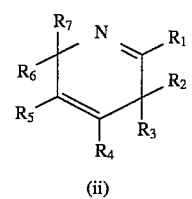  II (i)          (ii)

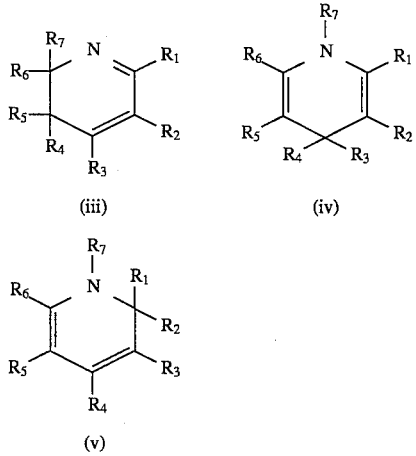

(iii) (iv) (v)

where $R_1$ to $R_7$, which may be the same or different, are independently selected from hydrogen, hydrocarbyl and heterohydrocarbyl groups, silyl groups, and substituted derivatives of any of the foregoing, and any two of the groups $R_1$ to $R_7$ may together form a mono- or polycyclic ring structure, which may optionally be a fused ring structure, and which in turn may be substituted, provided that none of the groups $R_1$ to $R_7$ is a group which is known to interfere with polymerisation, and that in the case of 1,4-dihydropyridines of formula II (iv) the groups $R_2$ and $R_5$ at the 3- and 5-positions are not both electron-withdrawing groups, (c) an onium salt selected from diazonium, iodonium and sulfonium salts which do not interfere with polymerisation, and (d) a soluble ionic salt, provided that the composition does not contain a peroxide, or a peroxide precursor which produces peroxide in the absence of air or any ingredient which is a significant source of radicals in the absence of air.

For the auto-oxidisable compound (b), 1,4-dihydropyridines of formula II (iv) and 1,2-dihydropyridines of formula II (v) are preferred, the 1,2-dihydropyridines being most preferred. $R_7$ in the compounds of formula II (iv) or II (v) is preferably other than hydrogen, and more preferably is an electron-donating group. In the case of 1,4-dihydropyridines of formula II (iv) the groups $R_2$ and $R_5$ at the 3- and 5-positions must not both be electron-withdrawing groups such as ester, acid, ketone, amide or nitrile groups because such substituents would render the 1,4-dihydropyridine stable to air oxidation. Other 1,4-dihydropyridines including the parent 1,4-dihydropyridine react rapidly in air (N. C. Cook and E. J. Lyons, J. Amer. Chem. Soc., 87, 3238 (1965)).

The term "hydrocarbyl" as used herein includes (i) straight chain or branched linear or alicyclic aliphatic groups including alkyl, alkenyl and alkynyl, preferably containing from 1 to 20, more preferably from 1 to 10, most preferably from 1 to 5 carbon atoms; and alkylene and alkenylene groups forming part of a ring structure which preferably contains from 3 to 30, more preferably 5 to 20 carbon atoms;

(ii) aromatic groups including aryl, alkaryl and aralkyl groups, preferably containing 6 to 20 carbon atoms, more preferably 6 to 10 carbon atoms, and optionally having a fused ring structure.

The term "heterohydrocarbyl" as used herein includes hydrocarbyl groups as described above interrupted by one or more hetero atoms selected from oxygen, nitrogen or sulphur.

The term "substituted" or "substituted derivative" as used herein includes the appropriate group substituted with one or more oxygen, nitrogen, sulphur or halogen atoms or atom-containing moieties, or with one or more hydrocarbyl, heterohydrocarbyl or silyl groups, which in turn may be substituted with one or more oxygen, nitrogen, sulphur or halogen atoms or atom-containing moieties. Preferably $R_1$ to $R_7$ and/or the substituents on the ring formed by any two of the $R_1$ to $R_7$ groups are hydrogen or methyl, ethyl, propyl, butyl, phenyl, benzyl, amide or trimethyl silyl groups. Halogen may be chlorine, bromine, fluorine or iodine.

Preferably the onium salt is selected from:

a stabilised or unstabilised diazonium salt corresponding to the general formula III:

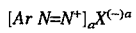

$$[Ar\ N{=}N^+]_a X^{(-)a}$$

wherein a is an integer of 1, 2 or 3 taken so as to equalise the valence charge of the salt and Ar is an aryl or substituted aryl radical (including diazonium-substituted aryl radicals), and X is an anion;

or an iodonium salt corresponding to the general formula IV:

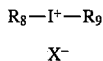

$$R_8{-}I^+{-}R_9$$
$$X^-$$

wherein $R_8$ and $R_9$, which may be the same or different, are selected from aryl or substituted aryl groups, for example, substituted with alkyl, alkoxy, alkenyl, cycloalkyl, cycloalkenyl, aryl, chloro, fluoro, bromo, iodo, and nitro groups, and $X^-$ is a monovalent anion, or a sulphonium salt corresponding to the general formula V:

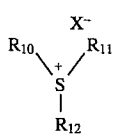

wherein $R_{10}$, $R_{11}$ and $R_{12}$ which may be the same or different are selected from aryl or substituted aryl groups (including fused ring substituted aryl radicals) and X is a monovalent anion.

In the diazonium salts of formula III, X is preferably an anion such as is ordinarily found in known diazonium salts and is taken so as to act as a counterion to the aryl diazonium cation moiety of the salt. X is most suitably selected from those described in U.S. Pat. No. 4,602,073, the contents of which is incorporated herein by reference, and includes, for example $F^-$, $Cl^-$, $Br^-$, $PF_6^-$, and $BF_4^-$.

In the iodonium salts of formula IV and the sulphonium salts of formula V, $X^-$ is a monovalent anion, for example $F^-$, $Cl^-$, $Br^-$, $BF_4^-$, $SbF_6^-$, $PF_6^-$ or $AsF_6^-$.

Preferred soluble ionic salts (d) are metal salts of the type generally used in oil drying technology. The metals should have several valency states and suitable metal salts are those of multivalent metals, especially transition metals. The metal ions are preferably present in their low valency state. The metal salt must be at least partially soluble in the composition, and may be present in the composition in an effective amount which is generally in a range of between about 1 and about 1,000 parts per million, preferably about 30 to 200 ppm.

The choice of metal may have a velocity determining effect on initiation of polymerisation because of a temperature dependence of the metal component in the process. Iron, cobalt, manganese and vanadium are highly active at room temperature. In addition, compounds of these metals can be mixed with one or more other metallic components such as lead, cerium, copper, calcium, barium, zinc and/or zirconium.

Metal naphthenates or metal acetyl acetonates are generally soluble in the composition, but other salts or organometallics may be used if they are sufficiently soluble.

The free-radically polymerisable monomer (a) may be selected from olefinically unsaturated systems such as acrylates, methacrylates, styrene, maleate esters, fumarate esters, unsaturated polyester resins, alkyd resins, thiol-ene compositions, and acrylate, methacrylate, or vinyl terminated resins including silicones and urethanes. Suitable acrylates and methacrylates are those used in polymerisable systems such as disclosed in U.S. Pat. No. 4,963,220 of Bachmann et. al., and U.S. Pat. No. 4,215,209 of Ray-Chaudhuri et al. Particularly preferred are hydroxyl-containing methacrylates especially hydroxylalkyl methacrylates such as hydroxypropyl methacrylate. Also preferred are methylmethacrylate, polyfunctional methylacrylates, silicone diacrylates and polyfunctional acrylated urethanes of the type known to be useful in formulating adhesives (e.g. as disclosed in U.S. Pat. No. 4,092,376 of Douek et al) or a thiol-ene (e.g. as disclosed in U.S. Pat. Nos. 3,661,744, 3,898,349, 4,008,341 or 4,808,638).

The autoxidisable compound (b) may be any dihydropyridine capable of reacting with atmospheric oxygen within the formulation, preferably by a free radical mechanism, for example as described herein or in EP 0,502,733A.

The following are examples of compounds which are suitable for use in the composition of the invention as autoxidisable compounds.

VI

N-phenyl-2-propyl-3,5-diethyl-1,2-dihydropyridine

VII

N-(4-methylphenyl)-2-propyl-3,5-diethyl-1,2-dihydropyridine

VIII

N-(4-methoxyphenyl)-2-propyl-3,5-diethyl-1,2-dihydropyridine

IX

N-decyl-2-propyl-3,5-diethyl-1,2-dihydropyridine

XII 2-propyl-3-ethyl-1,2-dihydroquinoline

The auto-oxidisable compound will generally be present in an effective amount for effecting polymerisation of the composition upon exposure to atmospheric oxygen. Such effective amount is generally within the range of from about 0.1 to about 20%, preferably from about 0.1 to about 10%, more preferably from about 0.5 to about 5%, based on the weight of the polymerisable composition.

The onium salt may be selected from either diazonium, iodonium or sulphonium salts or a combination thereof. The choice of onium salt used depends to a large extent on the autoxidisable compound being used. Suitable onium salts may be selected from those known as cationic photoinitiators for cationically polymerisable monomers and resins.

Typical but not limiting examples of suitable oniums salts are selected from diaryl iodonium, triarylsulphonium and aryldiazonium salts. The following are examples of compounds which are suitable for use in the present composition:

XIII 4-methoxybenzenediazonium hexafluorophosphate

XIV benzenediazonium tetrafluoroborate

XV diphenyl iodonium chloride

-continued

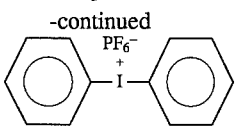

diphenyl iodonium hexafluorophosphate

XVI

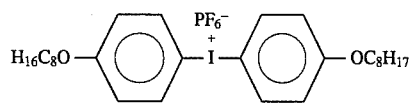

4,4'-dioctyloxydiphenyl iodonium hexafluorophosphate

XVII

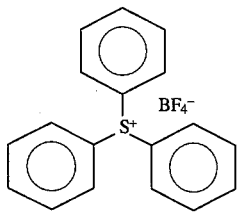

triphenylsulphonium tetrafluoroborate

XVIII

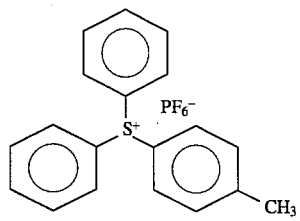

diphenyl tolylsulphonium hexafluorophosphate

XIX

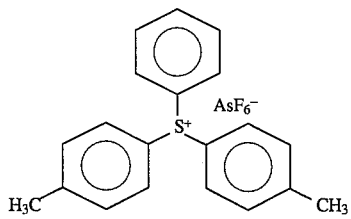

phenylditolyl sulphonium hexafluoroarsenate

XX

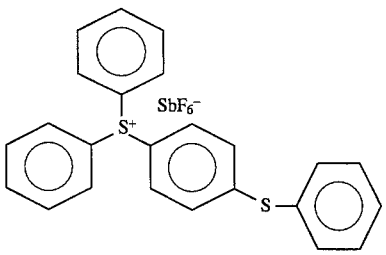

diphenyl-thiophenoxphenyl sulphonium hexafluoroantimonate

XXI

The composition may optionally further comprise reducing agents, thickeners, fillers, pigments and free radical polymerisation stabilisers.

For commercial compositions, the presence of fillers and/or thickeners is preferred. Filled and/or thickened compositions usually will not be photo-polymerisable.

Suitable reducing agents may be, but are not limited to, acetylphenylhydrazine, tetramethylthiourea or thiocaprolactam.

Polymeric thickeners may be present in the compositions in a minor amount, up to about 50%, and may be thickeners such as a polymer or prepolymer of low or high molecular weight. Suitable polymeric thickeners are a commercially available methacrylate polymer sold by E.I. du Pont de Nemours and Company, under the trademark Elvacite or by Rhom and Haas under the Trade Mark Ryloid, as well as styrene-methyl methacrylate co-polymers and polybisphenol A maleate (sold by ICI Americas Inc. under the trademark Atlac). It is also possible to add inert filling materials such as finely divided silica, fumed silica (treated or untreated), montmorillonite, clay, bentonite and the like. The use of micronized silica would result in a paste-like thixotropic composition.

Additionally, it is conventional to include in adhesive formulations certain "inert" fillers such as wood flour, glass fibres, cotton linters, mica, alumina, silica and the like to modify viscosity, improve impact resistance and for other purposes. Such fillers could be incorporated in the formulations of the present invention. Small percentages of silane monomers could also be added to increase moisture resistance, as well as to enhance bonding of an adhesive to glass and similar surfaces. Other substances such as dyes, fire retarders, stabilizers such as quinones and hydroquinones, thixotropes, plasticizers, antioxidants, and the like may also be included, although such additives may often be furnished in the principal ingredients, making their separate introduction unnecessary.

Peroxides, or peroxide percursors which produce peroxide in the absence of air, or any ingredient which is a significant source of radicals in the absence of air, should not be included in the compositions, so that polymerisation of the free-radically polymerisable monomer does not commence until it is exposed to oxygen.

The compositions of the present invention may suitably comprise 0.1 to 20% by weight of the auto-oxidisable compound, 0.1% to 20% by weight of the onium salt and at least 10% by weight of the free-radically polymerisable monomer, the remainder being the ionic salt, thickeners, fillers, pigments, reducing agents and/or stabilisers, the total constituents adding up to 100%. In the case of compositions containing fillers or thickeners the content of free-radically polymerisable monomers may suitably be up to 60% by weight.

The invention also provides a method of bonding two substrates comprising coating at least one substrate to be bonded with a composition as defined above, exposing the composition to oxygen for sufficient time to activate polymerization, and bringing the two substrates together. Typically at least about 5 seconds, but preferably at least about 30 seconds exposure to air would be suitable.

Furthermore the invention provides a method of forming a polymer, for example in topical coatings, encapsulation, moulding and the like, comprising exposing to oxygen for sufficient time to activate polymerization a composition as defined above. Typically at least about 5 seconds, but preferably at least about 30 seconds exposure to air would be suitable.

The above-described compositions are stable when prepared in the absence of air. Exposure to air results in the polymerisation of the composition, the polymerisation being sustained in the presence or absence of air once the initial exposure to air has taken place. Typically the exposure to air should be for at least about 5 seconds, preferably not less than 30 seconds, more preferably 1 to 5 minutes.

The compositions do not require exposure to light in the 310–420 nm range.

The compositions of the invention are true one-component polymerizable compositions and are thus much simpler to use than two-component compositions, and yet they have good stability when formulated under oxygen-free conditions and stored in a sealed container under inert gas. Their mechanism of polymerization is independent of the substrate and does not require photo-initiation and they thus have a wide range of applications. In addition it is possible to achieve a uniform distribution of cure in a thick bond line. Additionally, the compositions have rapid fixture times and good bond strengths. Furthermore they do not utilise weak acids of a volatile nature. It is surprising that an onium salt which is a neutral salt and a salt of strong acid can take the place of a weak acid in the activator system of an air-activatable composition.

DESCRIPTION OF THE PREFERRED EMBODIMENTS

The invention may be more fully understood with reference to the following examples.

EXAMPLE 1

An adhesive composition was prepared by formulating hydroxypropyl methacrylate (10 g), a commercially available sulphonium salt, GE UVE 1014 (a proprietary arylsulphonium salt formulation supplied by General Electric) (0.5 g) and 0.5 g of a cobalt naphthenate solution comprising 20 parts methyl methacrylate and one part of a 6% solution of cobalt naphthenate in hydrocarbon oil. This formulation was added to an aluminium tube (approximately 25 mls capacity) and exposed to a steady stream of argon gas through a syringe needle for a two minute period for the purpose of removing the dissolved oxygen. N-phenyl-2-propyl-3,5-diethyl-1,2-dihydropyridine (0.5 g) was added to the formulation under the argon atmosphere. Following a further period of bubbling with argon of approximately 30 seconds the aluminium tube was sealed by crimping, thus trapping an argon gas in the head space above the formulation. The aluminium tube was shaken for 10–20 seconds to ensure thorough mixing of the formulation components.

The adhesive was tested as follows: samples of the adhesive were squeezed from the aluminium tube and spread onto grit blasted mild steel laps (4×1 inches) to form a film of approximately 0.1 mm in depth and exposed to air for a measured interval (hereafter referred to as the open time). The laps were then brought together to form an adhesive joint with 0.5 inch overlap. As a result of activation by exposure to air rapid fixturing was observed. The adhesive bonds assmebled as above were allowed to cure fully at room temperature and tested after a 24 hour period according to ASTM 603. The bond strengths data obtained for a range of open times with this adhesive are presented in Table 1 below:

TABLE 1

| Open Times/ minutes | Tensile Shear Strengths N/mm² |
|---|---|
| 4 | 1.8 |
| 6 | 9.4 |
| 10 | 13.8 |

EXAMPLE 2

A series of adhesive compositions 2 (a–d) were prepared using the procedure described in Example 1, containing the following components:

| Example No. | 2a | 2b | 2c | 2d |
|---|---|---|---|---|
| HPMA | 8.9 g | 8.75 g | 8.5 g | 8.0 g |
| 0.1% ferric (acetylacetonate)₃ in HPMA | 0.5 g | 0.5 g | 0.5 g | 0.5 g |
| N-phenyl-2-propyl-3,5-diethyl-1,2-dihydropyridine | 0.5 g | 0.5 g | 0.5 g | 0.5 g |
| diphenyl iodonium hexafluorophosphate | 0.1 g | 0.25 g | 0.5 g | 1.0 g |

(HPMA is hydroxypropyl methacrylate)

The adhesive performance of the formulations following activation by exposure to air was tested as outlined in Example 1 and the results are presented in Table 2 which also includes 3 Kg fixture times i.e. the minimum times following assembly for bonds to support a 3 Kg weight as determined according to (ASTM 603).

TABLE 2

| Iodonium salt conc. | Open Times/ minutes | Tensile Shear Strength N/mm² | 3 Kg Fixture Times/minutes |
|---|---|---|---|
| (a) 1% | 2 | 8.0 | 14 |
|  | 4 | 4.0 | 13 |
|  | 10 | 2.6 | 11 |
| (b) 2.5% | 2 | 10.1 | 11 |
|  | 4 | 3.1 | 10.5 |
|  | 10 | 12 | 8 |
| (c) 5% | 2 | 7.7 |  |
|  | 4 | 3.1 |  |
|  | 10 | 3.0 |  |
| (d) 10% | 2 | 15.2 |  |
|  | 4 | 14.9 |  |
|  | 10 | 12.2 |  |

EXAMPLE 3a

An adhesive composition comprising hydroxypropyl methacrylate (8.5 g), a solution of hydroxypropyl methacrylate containing 0.1% ferric (acetylacetonate)₃ (1.0 g), N-phenyl-2-propyl-3,5-diethyl-1,2-dihydropyridine (0.5 g) and diphenyl iodonium chloride (0.5 g) was prepared using the procedure described in Example 1. The adhesive performance of the formulation was tested as outlined in Example 1 and is presented in Table 3a.

TABLE 3a

| Iodonium salt conc. | Open Times/ minutes | Tensile Shear Strength N/mm² | 3 Kg Fixture Times/minutes |
|---|---|---|---|
| 5% | 2 | 2.2 | 15 |
|  | 4 | 8.9 | 11.5 |
|  | 10 | 9.9 | 12 |

EXAMPLE 3b

An adhesive composition was prepared using the procedure described in Example 1 by formulating hydroxypropyl methacrylate (7.8 g), a solution of hydroxypropyl methacrylate containing 0.1% ferric (acetylacetonate)₃ (1.5 g), N-phenyl-2-propyl-3,5-diethyl-1,2-dihydropyridine (0.5 g) and diphenyl iodonium chloride (0.2 g). The adhesive performance of the formulation was tested as outlined in Example 1 and is presented in Table 3b.

TABLE 3b

| Iodonium salt conc. | Open Times/ minutes | Tensile Shear Strength N/mm² | 3 Kg Fixture Times/minutes |
|---|---|---|---|
| 2% | 2 | 10.7 | 18 |
|  | 4 | 13.2 | 10 |

EXAMPLE 4

A series of adhesive compositions 4 (a–b) were prepared using the procedure described in Example 1 by formulating hydroxypropyl methacrylate, a solution of hydroxypropyl methacrylate containing 0.1% ferric (acetylacetonate)$_3$, N-phenyl-2-propyl-3,5-diethyl-1,2-dihydropyridine and 4,4'dioctyloxydiphenyl iodonium hexafluorophosphate (II) at the concentrations outlined below.

| Example No. | 4a | 4b | 4c | 4d |
|---|---|---|---|---|
| HPMA | 8.9 g | 8.75 g | 8.5 g | 8.0 g |
| 0.1% ferric (acetylacetonate)$_3$ in HPMA | 0.5 g | 0.5 g | 0.5 g | 0.5 g |
| N-phenyl-2-propyl-3,5-diethyl-1,2-dihydropyridine | 0.5 g | 0.5 g | 0.5 g | 0.5 g |
| 4,4'dioctyloxydiphenyl iodonium hexafluorophosphate | 0.1 g | 0.25 g | 0.5 g | 1.0 g |

The adhesive performance of the formulations following activation by exposure to air was tested as outlined in Example 1 and the results are presented in Table 4 which also includes 3 Kg fixture times data.

TABLE 4

| Example No. | Open Times/ minutes | Tensile Shear Strength N/mm² | 3 Kg Fixture Times/minutes |
|---|---|---|---|
| (a) | 2 | 3.6 | 17 |
|  | 4 | 4.9 | 14.5 |
|  | 6 | 6.1 | 12 |
| (b) | 2 | 5.9 | 10 |
|  | 4 | 6.9 | 9.75 |
|  | 10 | 7.0 | 12.0 |
| (c) | 2 | 4.5 | 10.5 |
|  | 4 | 6.7 | 10 |
|  | 10 | 2.7 | 7 |
| (d) | 2 | 2.2 | 8.5 |
|  | 4 | 2.6 | 7.5 |
|  | 6 | 0.9 | 7 |

EXAMPLE 5

An adhesive formulation was prepared using the procedure described in Example 1 by formulating hydroxypropyl methacrylate (10.0 g), N-phenyl-2-propyl-3,5-diethyl-1,2-dihydropyridine (0.5 g) and 0.5 g of a cobalt naphthenate solution comprising 20 parts methyl methacrylate and one part of a 6% solution of cobalt naphthenate in hydrocarbon oil and a proprietary benzene diazonium salt formulation supplied by Asahi Denka, Tokyo under the designation P-33, (0.5 g). The adhesive performance of this formulation was determined as per Example 1 and is presented below.

TABLE 5

| Open Times/ minutes | Tensile Shear Strengths N/mm² |
|---|---|
| 2 | 1.5 |
| 4 | 6.2 |

EXAMPLE 6

An adhesive composition was prepared using the procedure described in Example 1 by formulating hydroxypropyl methacrylate (10.0 g), N-phenyl-2-propyl-3,5-diethyl-1,2-dihydropyridine (0.5 g) and 1.0 g of a cobalt naphthenate solution comprising 20 parts methyl methacrylate and one part of a 6% solution of cobalt naphthenate in hydrocarbon oil and the proprietary benzene diazonium salt formulation supplied by Asahi Denka, Tokyo under the designation P-33, (0.5 g). The adhesive performance of this formulation was determined as per Example 1 and is presented below.

TABLE 6

| Open Times/ minutes | Tensile Shear Strengths N/mm² |
|---|---|
| 2 | 1.9 |
| 4 | 1.4 |
| 6 | 3.2 |
| 10 | 4.6 |

EXAMPLE 7

An adhesive formulation was prepared using the procedure described in Example 1 by formulating hydroxypropyl methacrylate (10.0 g), N-phenyl-2-propyl-3,5-diethyl-1,2-dihydropyridine (0.5 g) and 0.5 g of an iron (III) naphthenate solution comprising 20 parts methyl methacrylate and one part of a 6% solution of cobalt naphthenate in hydrocarbon oil and the proprietary benzene diazonium salt formulation supplied by Asahi Denka, Tokyo under the designation P-33, (0.5 g). The adhesive performance of this formulation was determined as per Example 1 and is presented below.

TABLE 7

| Open Times/ minutes | Tensile Shear Strengths N/mm² |
|---|---|
| 2 | 1.6 |
| 4 | 3.0 |
| 6 | 5.1 |
| 10 | 10.3 |

EXAMPLE 8a

An adhesive formulation comprising hydroxypropyl methacrylate (7.7 g), a solution of hydroxypropyl methacrylate containing 0.1% ferric (acetylacetonate)$_3$ (1.5 g,), N-decyl-2-propyl-3,5-diethyl-1,2-dihydropyridine (0.5 g) and diphenyl iodonium chloride (0.3 g) was prepared using the procedure described in Example 1. The adhesive performance of the formulation was tested by activation in air as outlined in Example 1 and is presented in Table 8a.

TABLE 8a

| Iodonium salt conc. | Open Times/ minutes | Tensile Shear Strength N/mm² |
|---|---|---|
| 3% | 2 | 5.6 |
|  | 4 | 14.4 |

EXAMPLE 8a

An adhesive formulation was prepared using the procedure described in Example 1 by formulating hydroxypropyl methacrylate (7.2 g), a solution of hydroxypropyl methacrylate containing 0.1% ferric (acetylacetonate)$_3$ (2.0 g), N-decyl-2-propyl-3,5-diethyl-1,2-dihydropyridine (0.5 g) and diphenyl iodonium chloride (0.3 g). The adhesive performance of the formulation was tested as outlined in Example 1 and is presented in Table 8b.

TABLE 8b

| Iodonium salt conc. | Open Times/ minutes | Tensile Shear Strength N/mm² |
|---|---|---|
| 3% | 2 | 10.8 |
|  | 4 | 11.6 |

EXAMPLE 9

A series of adhesive compositions 9 (a–c) were prepared using the procedure described in Example 1 by formulating hydroxypropyl methacrylate, a solution of hydroxypropyl methacrylate containing 0.1% ferric (acetylacetonate)$_3$, N-phenyl-2-propyl-3,5-diethyl-1,2-dihydropyridine and di-4,4'-octyloxyphenyl iodonium hexafluorophosphate at the following concentrations.

| Example No. | 9a | 9b | 9c |
|---|---|---|---|
| HPMA | 7.5 g | 8.25 g | 8.4 g |
| 0.1% ferric (acetylacetonate)$_3$ in HPMA | 1.0 g | 0.25 g | 0.1 g |
| N-phenyl-2-propyl-3,5-diethyl-1,2-dihydropyridine | 0.5 g | 0.5 g | 0.5 g |
| di-4,4'-octyloxyphenyl iodonium hexafluorophosphate | 1.0 g | 1.0 g | 1.0 g |

The adhesive performance of the formulations was tested by activation in air as outlined in the previous examples.

TABLE 9

| Formulation No. | Open Times/ minutes | Tensile Shear Strength N/mm² | 3 Kg Fixture Times/minutes |
|---|---|---|---|
| (9a) | 2 | 4.3 | 17 |
|  | 4 | 5.8 | 15.5 |
|  | 6 | 5.9 | 10.5 |
| (9b) | 2 | 2.8 | 9 |
|  | 4 | 3.6 | 7.5 |
|  | 10 | 9.6 | 7 |
| (9c) | 2 | 3.6 | 9 |
|  | 4 | 3.9 | 9.5 |
|  | 10 | 1.8 | 6.5 |

EXAMPLE 10

Two adhesive compositions 10 (a and b) comprising hydroxypropyl methacrylate (HPMA), a solution of hydroxypropyl methacrylate containing 1000 ppm cobalt (in the form of 6% cobalt naphthenate salt in hydrocarbon oil), N-phenyl-2-propyl-3,5-diethyl-1,2-dihydropyridine and a proprietary arylsulphonium salt formulation supplied by General Electric under the designation GE UVE 1014 at the following concentrations were prepared using the procedure described in Example 1.

| Example No. | 10a | 10b |
|---|---|---|
| HPMA | 7.5 g | 8.25 g |
| 1000 ppm cobalt soln. in HPMA | 0.1 g | 0.75 g |
| N-phenyl-2-propyl-3,5-diethyl-1,2-dihydropyridine | 0.5 g | 0.5 g |
| GE UVE 1014 | 1.0 g | 1.0 g |

The adhesive performance of the formulations was tested as outlined in Example 1.

TABLE 10

| Formulation No. | Open Times/ minutes | Tensile Shear Strength N/mm² |
|---|---|---|
| (10a) | 2 | 0.5 |
|  | 4 | 7.7 |
|  | 6 | 8.7 |
| (10b) | 2 | 2.9 |
|  | 4 | 3.2 |
|  | 10 | 4.1 |

EXAMPLE 11

An adhesive formulation was prepared as in Example 1, comprising the following:

| | |
|---|---|
| HPMA | 10 g |
| GE UVE 1014 (a proprietary arylsulphonium salt formulation) | 0.5 g |
| 0.3% Cobalt naphthenate | 0.5 g |
| N-phenyl-2-propyl-3,5-diethyl-1,2-dihydropyridine | 0.5 g |

The 3 Kg fixture times were determined for this formulation by exposing the formulation to air in the dark on glass substrates. For a two minute open time the observed fixture time was 20 minutes which is the same result obtained when formulation is exposed to air in ambient light.

EXAMPLE 12 (Comparative)

An adhesive formulation was prepared using the procedure described in Example 1 by formulating hydroxypropyl methacrylate (8.75 g), a solution of hydroxypropyl methacrylate containing 0.1% ferric (acetylacetonate)3 (0.5 g), diethyl 1,4-dihydro-2,4,6-trimethyl-3,5 pyridine dicarboxylate (0.5 g) and diphenyl iodonium chloride (0.25 g). The adhesive performance of the formulation was tested as outlined in Example 1, and is presented in Table 11.

TABLE 11

| Open Times/ minutes | Tensile Shear Strength N/mm² |
|---|---|
| 2 | 0 |
| 4 | 0 |
| 10 | 0 |

The adhesive formulation failed to give fixtures even after being open to the air for up to 30 minutes.

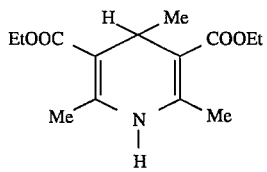

XXII

This 1,4-dihydropyridine derivative having the formula XXII was stabilised by the electron-withdrawing ester groups at the 3- and 5-positions and failed to function as an auto-oxidisable compound.

I claim:

1. A storage stable, one-part, air-activatable, polymerisable composition comprising:

(a) at least 10% by weight of the composition of a monomer component, the monomer component being at least one free-radically polymerisable olefinically unsaturated monomer, and an activator system for effective polymerization of the free-radically polymerisable olefinically unsaturated monomer, said activator system comprising:

(b) 0.1 to 20% by weight of the composition of an auto-oxidizablic compound which is a dihydropyridine having a general formula selected from II (i)–(v)

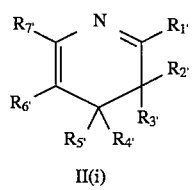
II(i)

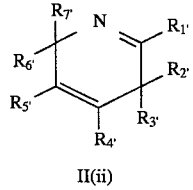
II(ii)

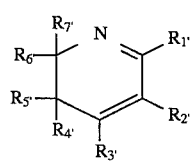
II(iii)

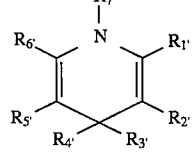
II(iv)

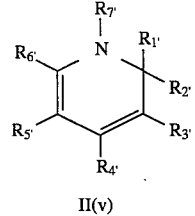
II(v)

wherein $R_1'$ to $R_7'$ which may be the same or different, are independently selected from hydrogen and hydrocarbyl and heterohydrocarbyl groups, silyl groups, and substituted derivatives of the foregoing, and any two of the groups $R_1'$ to $R_7'$ may together form a substituted or unsubstituted mono-cyclic ring structure or a substituted or unsubstituted poly-cyclic ring structure, which may be fused ring structure, with the proviso that none of the groups $R_1'$ to $R_7'$ comprise or contain a group which is known to interfere with polymerization, and that, in the case of 1,4-dihydropyridines of the formula II(iv), the groups $R_2'$ and $R_5'$ at the 3- and 5-positions are not both electron-withdrawing groups;

(c) 0.1 to 20% by weight of the composition of an onium salt selected from diazonium, iodonium or sulfonium salts which do not interfere with polymerization; and (d) a soluble ionic salt;

provided that the composition does not contain a peroxide, or a peroxide precursor which produces peroxide in the absence of air, or any ingredient which is a significant source of radicals in the absence of air and that said polymerisable compositions are prepared and maintained under anaerobic conditions and polymerisable under aerobic or anaerobic conditions after exposure to air;

and wherein the term "heterohydrocarbyl" refers to a hydrocarbyl group interrupted by one or more oxygen, nitrogen or sulfur atoms, and the terms "substituted" and "substituted derivative" in reference to hydrocarbyl, heterohydrocarbyl and silyl groups means the respective groups substituted with one or more groups comprising oxygen, nitrogen, sulfur or halogen atoms.

2. A composition as claimed in claim 1 wherein the onium salt is a stabilised or unstabilised diazonium salt corresponding to the general formula III:

$$[Ar\ N{=}N^{+}]_a X^{(-)a}$$

wherein a is an integer of 1, 2 or 3 taken so as to equalise the valence charge of the salt and Ar is an aryl or substituted aryl radical and X is an anion.

3. A composition as claimed in claim 1 wherein the onium salt is an iodonium salt corresponding to the general formula IV:

$$R_8{-}I^+{-}R_9$$
$$X^-$$

wherein $R_8$ and $R_9$, which may be the same or different, are selected from aryl or substituted aryl groups, and X is a monovalent anion.

4. A composition as claimed in claim 1 wherein the onium salt is a sulphonium salt corresponding to the general formula V:

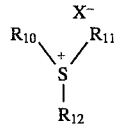

wherein $R_{10}$, $R_{11}$ and $R_{12}$ which may be the same or different are selected from aryl or substituted aryl groups and X is a monovalent anion.

5. A composition as claimed in claim 2 wherein a substituted aryl group is substituted with one or more alkyl, alkoxy, alkenyl, cycloalkyl, cycloalkenyl, aryl, chloro, fluoro, bromo, iodo, nitro or thiophenoxy groups.

6. A composition as claimed in claim 2 wherein X is selected from F$^-$, Cl$^-$, Br$^-$, BF$^-_4$, SbF$^-_6$, PF$^-_6$ or AsF$^-_6$.

7. A composition as claimed in claim 2 wherein the onium salt is 4-methoxybenzenediazonium hexafluorophosphate or benzenediazonium tetrafluoroborate.

8. A composition as claimed in claim 3 wherein the onium salt is diphenyl iodonium chloride, diphenyl iodonium hexafluorophosphate, or 4,4'-dioctyloxydiphenyl iodonium hexafluorophosphate.

9. A composition as claimed in claim 4 wherein the onium salt is triphenylsulphonium tetrafluoroborate, diphenyl tolylsulphonium hexafluorophosphate, phenylditolyl sulphonium hexafluoroarsenate, or diphenyl-thiophenoxyphenyl sulphonium hexafluoroantimonate.

10. A composition as claimed in claim 1 which further comprises at least one member of the group consisting of thickeners, fillers, pigments, reducing agents and stabilizers.

11. A composition as claimed in claim 3 wherein a substituted aryl group is substituted with one or more alkyl, alkoxy, alkenyl, cycloalkyl, cycloalkenyl, aryl, chloro, fluoro, bromo, iodo, nitro or thiophenoxy groups.

12. A composition as claimed in claim 4 wherein a substituted aryl group is substituted with one or more alkyl, alkoxy, alkenyl, cycloalkyl, cycloalkenyl, aryl, chloro, fluoro, bromo, iodo, nitro or thiophenoxy groups.

13. A composition as claimed in claim 3 wherein X is selected from $F^-$, $Cl^-$, $Br^-$, $BF_4^-$, $SbF_6^-$, $PF_6^-$ or $AsF_6^-$.

14. A composition as claimed in claim 4 wherein X is selected from $F^-$, $Cl^-$, $Br^-$, $BF_4^-$, $SbF_6^-$, $PF_6^-$ or $AsF_6^-$.

15. A composition as claimed in claim 2 wherein Ar is a diazonium-substituted aryl radical.

16. The composition of claim 4 wherein at least one of $R_{10}$, $R_{11}$ and $R_{12}$ is a fused ring substituted aryl group.

17. The composition as claimed in claim 1 wherein the hydrocarbyl groups are selected from straight chain or branched linear or alicyclic aliphatic groups having from 1–20 carbon atoms; alkylene and alkenylene groups forming part of a ring structure having from 3–30 carbon atoms; and aromatic groups having from 6–20 carbon atoms.

18. The composition as claimed in claim 1 wherein the hydrocarbyl groups are straight chain or branched linear or alicyclic aliphatic groups having from 1–10 carbon atoms; alkylene and alkenylene groups forming part of a ring structure having from 5–20 carbon atoms; and aromatic groups having from 6–10 carbon atoms.

19. The composition as claimed in claim 17 wherein the aromatic groups are selected from aryl, alkaryl and aralkyl groups.

20. The composition as claimed in claim 1 wherein the free radically polymerisable olefinically unsaturated monomer (a) is selected from acrylates, methacrylates, styrene, maleate esters, fumarate esters, unsaturated polyester resins, alkyd resins, thiol-ene compositions or acrylate, methacrylate, or vinyl terminated silicone or urethane resins.

* * * * *

UNITED STATES PATENT AND TRADEMARK OFFICE
CERTIFICATE OF CORRECTION

PATENT NO. : 5,506,326
DATED : April 9, 1996
INVENTOR(S) : BRENDAN KNEAFSEY It is certified that error appears in the above-identified patent and that said Letters Patent is hereby corrected as shown below:

Col. 17, line 26, delete "auto-oxidizablic" and insert
-- auto-oxidizable --

Signed and Sealed this

Sixteenth Day of July, 1996

Attest:

BRUCE LEHMAN

Attesting Officer    Commissioner of Patents and Trademarks